United States Patent [19]

Biegay

[11] Patent Number: 4,492,849

[45] Date of Patent: Jan. 8, 1985

[54] METHOD OF WELDING STEEL STRIP

[75] Inventor: Jack M. Biegay, Freeport, Pa.

[73] Assignee: Allegheny Ludlum Steel Corporation, Pittsburgh, Pa.

[21] Appl. No.: 267,176

[22] Filed: May 26, 1981

[51] Int. Cl.³ .......................... B23K 9/02; B23K 20/24
[52] U.S. Cl. ....................... 219/137 WM; 219/137 R; 228/203; 228/263.15
[58] Field of Search ........... 219/137 WM, 76.14, 76.1, 219/137 R, 104, 105, 146.1; 228/203, 205, 263.15; 148/127; 428/660, 683

[56] References Cited

U.S. PATENT DOCUMENTS

| | | | |
|---|---|---|---|
| 928,224 | 8/1909 | Shoemaker | 361/321 X |
| 3,319,043 | 5/1967 | Rohrberg | 219/137 R |
| 3,584,187 | 6/1971 | Majetich | 219/137 WM |
| 3,596,053 | 8/1971 | Kameda | 219/146.1 X |

Primary Examiner—Clifford C. Shaw
Assistant Examiner—C. M. Sigda
Attorney, Agent, or Firm—Patrick J. Viccaro

[57] ABSTRACT

A method of autogenous welding steel strip is disclosed including the steps of applying to at least one edge of a section of the strip to be welded, a material selected from the group consisting of titanium, titanium alloys, aluminum and manganese, positioning the edges in desired relative relationship and effecting welding. The applied material effects a chemical change in the steel strip to resist hot cracking in the weld, provides increased ductility and increased strength. The steel strip is preferably silicon steel or stainless steel strip.

16 Claims, No Drawings

METHOD OF WELDING STEEL STRIP

BRIEF SUMMARY OF THE INVENTION

The present invention relates generally to welding of steel and, more particularly this invention pertains, to a method of welding steel strip in such fashion as to resist formation of undesired hot cracking in the weld zone.

One of the problems encountered in connection with welding of steel strip, particularly strip of relatively small gage, is that alloys for use in such strip, such as silicon steel and stainless steel alloys, are generally selected on the basis of optimum metallurgical properties and not weldability. As a result, when sections of such strip are joined, the weld area may present a zone of weakness which during subsequent reduction of thickness of the strip, as by cold rolling, or winding of the same, produces an increased risk of undesired fracture of the strip at the location of the weld.

While with respect to heavier gage metal, the weld properties may be enhanced through the use of consumable welding filler wires or rods, such wires and rods cannot be employed in connection with thin gage materials which are typically wound in coil form as use of such fillers would result in an undesirable increase in cross sectional thickness in the weld zone, while uniformity of thickness of the strip is desired.

There remains, therefore, a need for a method for effective welding of steel strip, such as silicon steel and stainless steel strip, wherein the weld will have improved properties.

The method of the present invention has met the above-described needs. In the present method a material selected from the group consisting of titanium, titanium alloys, aluminum and manganese is applied to at least one edge of the sections of steel strip which are to be welded. Subsequent welding results in a chemical change in the steel strip base materials in the region of the weld so as to resist undesired hot cracking, as well as provide increased strength and increased ductility.

It is an object of the present invention to provide a method for welding steel strip of relative small gage in such fashion as to resist formation of undesired hot cracks within the weld zone.

It is another object of the present invention to provide such a method of welding steel strip wherein the strength of weld is substantially increased as is ductility in the weld zone.

It is a further object of the present invention to provide such a method which may readily be employed on production lines and will produce welds which will survive subsequent cold rolling and winding of the strip material.

It is another object of this invention to provide such a method which may be employed without appreciable thickening of the strip material within the weld zone.

These and other objects of the invention will be more fully understood from the following description of the invention.

DETAILED DESCRIPTION

In the preferred method of the present invention, sections of steel strip which are to be welded, for example, as a desired regular production technique or to rejoin a strip after a defective portion has been removed, are subjected to application on at least one of the portions to be welded with a material selected from the group consisting of titanium, titanium alloys, aluminum and manganese. The material is applied to the edge of the strip and the edges are placed in the desired relative position with welding being effected without the use of filler wires or rods.

The titanium, titanium alloys, aluminum and manganese may be applied to the edge of the strip to be welded by a number of methods. One method is to manually rub a rod of the material against the edge. Another method is to insert a rod of such material into a device, such as a rotary drill, and apply the spinning rod directly against such edge. It should be understood that the sheared edge of strip material is typically of sufficient rough texture to cause deposit of the material along the frayed surface. In other embodiments, the area of the base metal to be welded may have to be treated with a preliminary surface roughing step prior to applying the titanium, titanium alloy, aluminum or manganese to such area.

One advantageous means of applying the material to the edges is to select a material which has a lesser hardness than the steel strips. For example, a titanium rod or bar may be rubbed or abraded against the steel strip edges thereby permitting transfer of quantities of the titanium bar to the edges to preferably provide a generally continuous covering of the edges. An alternate approach, although less preferred, would be to apply particles of a material selected from the above grouping to the edges. In general, a butt weld will be established by placing the thus treated edges of the steel strips in contacting abutting relationship. Among the preferred means of effecting welding without the use of a consumable wire or rod is fusion welding such as gas tungsten arc welding.

In general, the applied materials serve as a gettering agent so as to reduce the effect of potentially undesirable materials contained within the steel strip, such as sulfur, for example. In effecting the chemical change through this gettering agent, it has been found that not only are undesired hot cracks in the weld resisted and the ductility and strength of the material in this zone improved, but the welded strip may be subjected to cold rolling mill reduction and rewinding with the weld zone having greater tensile strength, in many instances, than the original base metal.

As is understandable, the amount of material to be applied to the edges of strip to be welded may vary depending on the application for the welded strip. In general, the material should be applied to substantially completely cover the area of at least one edge of the material to be welded. However, the sufficiency of the application of the material may be quantitatively determined by subsequently observing that hot cracking had been resisted in the weld.

Among the suitable silicon steels with respect to which the method of the present invention may be used advantageously is one having the following composition (on a weight percent basis): silicon about 3.00 to 3.25%, tin about 0.035 to 0.045%, manganese about 0.031 to 0.036%, carbon about 0.027 to 0.037%, sulfur about 0.014 to 0.018%, phos. max. about 0.020%, nickel max. about 0.0045%, boron about 0.0011–0.0015% (11–15 ppm) with the balance iron. Residual amounts of other elements, including aluminum, copper and titanium may be present. Such material is sold under the trademark "SX-14" by Allegheny Ludlum Steel Corporation.

Other steel strip material suitable for the present invention include stainless steel, such as Type 430 stainless steel, ferritic alloys such as Al "29-4-2" alloy sold by Allegheny Ludlum Steel Corporation and stainless steel sold under the registered trademarks "E-BRITE" and "E-BRITE 26-1" by Allegheny Ludlum Steel Corporation.

The invention has been particularly advantageous in connecting with strip having a thickness of less than about 0.100 and preferably with a gage less than about 0.065 inch, and for certain applications, such as electrical steel strip, this invention is particularly advantageous in connecting strip having a gage less than about 0.030 inch prior to final cold reduction and a thickness of less than about 0.015 inch after such reduction.

In order to provide further guidance regarding the invention, illustrative examples will now be considered.

EXAMPLE 1

Two strips of silicon sheet having a thickness of about 0.022 inch and a Rockwell hardness of about 30 Rc are to be butt welded. The strips have a composition which includes on a weight percent basis about 3.13% silicon, 0.036% manganese, 0.020% sulfur, 0.030% carbon, 0.038% tin, 11 ppm boron and the balance iron and minor impurities. A titanium rod or bar having a Rockwell hardness of 90 Rb is manually rubbed or abraded against at least one of the sheared edges of the strip to deposit titanium on such edge. The strip edges are then placed in abutting contacting relationship and are welded by gas tungsten arc welding without the use of a filler wire or rod. The resulting weld has reduced hot cracking and improved ductility and strength.

EXAMPLE 2

The procedure of Example 1 is repeated except that in lieu of rubbing or abrading by a titanium bar or rod, manganese particles are placed on or between the strip edges.

EXAMPLE 3

Type 430 stainless steel typically produces brittle welds when joined by conventional fusion welding techniques. In this example, at least one sheared edge of 0.072 inch gage Type 430 stainess steel strip was rubbed with a titanium rod which resulted in deposition of a minor amount of titanium at the joint of the strips to be welded. The strips were fusion welded. Without the titanium edge treatment of the present invention the weld of joined Type 430 stainless steel strips would break catastrophically when bent transversely over a one inch radius. The Type 430 stainless steel joined by the method of the present invention is, surprisingly, able to be bent transversely over a one inch radius without breakage. It will, therefore, be appreciated that the present invention has provided an effective means of welding small and intermediate gage steel strip materials in a manner which effects a chemical change to the base metal in the weld zone so as to resist undesired hot cracking, improved ductility and improved strength. All of this is accomplished in a simple and economical manner which is consistent with current manufacturing technology and further avoids the undesired increase in thickness which would result from use of a consumable welding wire or rod.

Whereas particular embodiments of the invention have been described above for purposes of illustration, it will be evident to those skilled in the art that numerous variations of the details may be made without departing from the invention as defined in the appended claims.

I claim:

1. A method of autogenous welding sections of steel strip comprising the steps of:
   applying to at least one edge of said strip sections a material selected from the group consisting of titanium, titanium alloys, aluminum and manganese, by rubbing a solid piece of said material against said edge,
   placing said strip sections to be welded in a desired relative position, and
   welding said strip sections, whereby said material is applied in amounts sufficient to effect a chemical change in said steel strip in the weld zone to resist undesired hot cracking in said weld.

2. The method of welding steel strip as set forth in claim 1 wherein said steel strip is silicon steel.

3. The method of welding steel strip as set forth in claim 1 wherein said steel strip is stainless steel.

4. The method of welding steel strip as set forth in claim 2 including providing said applied material of a lesser hardness than the hardness of said silicon steel strip.

5. The method of welding steel strip as set forth in claim 4 including employing titanium as said applied material.

6. The method of welding steel strip as set forth in claim 1 including subsequent to said welding, effecting a reduction in gage of said steel strip by cold rolling.

7. The method of welding steel strip as set forth in claim 1 including effecting said welding by gas tungsten arc welding.

8. The method of welding steel strip as set forth in claim 1 including employing manganese as said applied material.

9. The method of welding steel strip as set forth in claim 1 including employing aluminum as said applied material.

10. The method of welding steel strip as set forth in claim 1 wherein said strip prior to welding has a thickness of less than about 0.100 inch.

11. The method of welding steel strip as set forth in claim 1 wherein said strip prior to welding has a thickness less than about 0.065 inch.

12. The method of welding steel strip as set forth in claim 1 wherein said strip prior to welding has a thickness less than about 0.030 inch.

13. The method of welding steel strip as set forth in claim 6 said strip after said reduction in thickness having a thickness of less than about 0.015 inch.

14. The method of welding steel strip as set forth in claim 3 applying said material so as to substantially completely cover said at least one edge of said strip section with said applied material.

15. The method of welding steel strip as set forth in claim 1 wherein said applied material is applied to all edges of the strip sections to be welded.

16. The method of welding steel strip as set forth in claim 1 including the initial step of providing an abrasive surface on the edge of the strip section to have material applied thereto.

* * * * *

UNITED STATES PATENT OFFICE
CERTIFICATE OF CORRECTION

Patent No. 4,492,849          Dated   January 8, 1985

Inventor(s)   Jack M. Beigay

It is certified that error appears in the above-identified patent and that said Letters Patent are hereby corrected as shown below:

On the title page;
the line under the heading

"United States Patent [19]", correct the name to read -- Beigay --.

correct Item [75] to read as follows:

-- [75] Inventor: Jack M. Beigay,
Freeport, Pa. -- column 3, line 3, delete "Al '29-4-2'" and substitute -- AL 29-4-2 --.

Signed and Sealed this

Twenty-third Day of July 1985

[SEAL]

Attest:

DONALD J. QUIGG

Attesting Officer        Acting Commissioner of Patents and Trademarks